United States Patent Office

Re. 24,526
Reissued Aug. 26, 1958

24,526

HIGH-PRESSURE REACTION OF CARBON MONOXIDE WITH HYDRAZINE

Herman J. Sampson, Jr., Camden, S. C., assignor to E. I. du Pont de Nemours & Company, Wilmington, Del., a corporation of Delaware No Drawing. Original No. 2,589,289, dated March 18, 1952, Serial No. 18,295, March 31, 1948. Application for reissue March 13, 1958, Serial No. 721,326

5 Claims. (Cl. 260—554)

Matter enclosed in heavy brackets [ ] appears in the original patent but forms no part of this reissue specification; matter printed in italics indicates the additions made by reissue.

This invention relates to new chemical processes involving carbon monoxide and to the resulting products.

Because of the abundant availability, chemical versatility, and low cost of carbon monoxide, its chemistry is receiving increasing attention. During the war certain of its reactions formed the basis of important chemical industries which provided Germany with valuable chemicals which were in short supply and great demand. The reactions of carbon monoxide with nitrogenous compounds have been investigated to a limited degree. Thus, its reactions with ammonia and with primary, secondary, and tertiary amines have been investigated. With ammonia the reaction can be made to yield either urea or hydrocyanic acid and with the primary, secondary, and tertiary amines there can be obtained either ureas or formyl derivatives, or both, depending upon the conditions of operation.

It is an object of this invention to provide a new chemical process utilizing carbon monoxide as a reactant. A further object of this invention is to prepare valuable nitrogenous compounds utilizing carbon monoxide as a reactant. A still further object is to prepare new chemical compounds. Another object is to provide an improved synthesis for semicarbazide, *and* hydrazodicarbonamide [and the nitrogen compound corresponding to the molecular formula $C_2H_4N_4O$ [1,2-dihydro-3(4-sym. tetrazone)]]. Other objects will appear hereinafter.

According to this invention the nitrogenous compounds, semicarbazide *and* hydrazodicarbonamide [, the nitrogen compound corresponding to the molecular formula $C_2H_4N_4O$ [1,2-dihydro-3(4-sym. tetrazone)] and a new water soluble nitrogenous compound, corresponding in molecular formula to $C_4H_6N_6$ melting at 120.4° to 121.4° C. and boiling at 268.5° to 269° C. at 759 mm.,] are produced by a process which comprises reacting carbon monoxide with hydrazine at superatmospheric pressures and at temperatures in the range of 0° to [300° C.] *200° C.*

It has been found that when carbon monoxide is reacted with hydrazine under pressure there may be obtained semicarbazide *and* hydrazodicarbonamide [, the nitrogen compound corresponding to the molecular formula $C_2H_4N_4O$ [1,2-dihydro-3-(4-sym. tetrazone)] or the new nitrogenous, water-soluble, composition corresponding in molecular formula to $C_4H_6N_6$, melting at 120.4 to 121.4° C. and boiling at 268.5° to 269° C. at 759 mm., depending upon the conditions for reaction selected. Thus,] if the reaction is carried out in the presence of a catalytic amount of a metal carbonyl. [, the products obtained are semicarbazide and hydrazodicarbonamide and if in the absence of the added metal carbonyl catalyst, the products are the nitrogen compound corresponding to the molecular formula $C_2H_4N_4O$ [1,2-dihydro-3(4-sym. tetrazone)] or the new water-soluble nitrogenous material corresponding in molecular formula to $C_4H_6N_6$]. This invention therefore provides a new route to the known compounds semicarbazide *and* hydraroute to the known compounds semicarbazide *and* hydrazodicarbonamide [and the nitrogen compound corresponding to the molecular formula $C_2H_4N_4O$ [1,2-dihydro-3(4-sym. tetrazone)] and makes available the new water-soluble nitrogenous product mentioned above].

In the production of semicarbazide and hydrazodicarbonamide [, to the exclusion of the nitrogen compound corresponding to the molecular formula $C_2H_4N_4O$ [1,2-dihydro-3(4-sym. tetrazone)] and $C_4H_6N_6$,], there is included in the reaction mixture a catalytic amount of a metal carbonyl compound. The amount employed will be from 0.005 to 10% and preferably from 1 to 5% by weight of the combined reactants. [The production of the nitrogen compound corresponding to the molecular formula $C_2H_4N_4O$ [1,2-dihydro-3(4-sym. tetrazone)], and $C_4H_6N_6$ proceeds in the absence of a catalyst.]

Examples of metal carbonyls useful in the practice of this invention are iron carbonyl, nickel carbonyl and cobalt carbonyl.

As previously stated, the process of this invention is operated at temperatures in excess of 0° C. Generally, however, temperatures of from 20° to 100° C. are employed when the reaction is to be carried out principally for the product of semicarbazide *and* 50° to 200° C. for hydrazodicarbonamide. [, 100° to 200° C. for the nitrogen compound corresponding to the molecular formula $C_2H_4N_4O$ [1,2-dihydro-3(4-sym. tetrazone)], and 200° to 300° C. when the water-soluble nitrogenous product $C_4H_6N_6$ is desired.]

Pressures in excess of atmospheric and preferably [above 5 atmospheres are employed, irrespective of the type of product desired. If the reaction is to be directed to the preparation of semicarbazide and hydrazodicarbonamide pressures] in excess of 30 atmospheres in the presence of a metal carbonyl catalyst are used [and if the nitrogen compound corresponding to the molecular formula $C_2H_4N_4O$ [1,2-dihydro-3(4-sym. tetrazone)] and the nitrogenous, water-soluble product corresponding in molecular formula to $C_4H_6N_6$ are desired, the process is operated in the absence of a catalyst under pressures in excess of 60 atmospheres]. Pressures above about 1000 atmospheres may be used if desired, but the employment of such high pressures does not appear to have compensating advantages from the standpoint of yield.

The examples which follow are submitted to illustrate and not to limit this invention. The yields expressed in the examples are based on the use of one mole of hydrazine per two nitrogens in the product.

EXAMPLE I

A mixture of 50 ml. of hydrazine hydrate and 2 g. of iron carbonyl was heated at 41° to 45° C. for 10 hours under a pressure of 800–900 atm. of carbon monoxide. The product, a purple syrup, was filtered free of a black infusible powder and evaporated as far as possible at 100° C. and 20 mm. pressure. The residue was dissolved in 600 ml. of absolute alcohol, and through filtration separated from approximately 2 g. of a pyrophoric iron compound. The filtrate was evaporated and 26 g. of semicarbazide was obtained. Acidification of the mother liquor yielded 8 g. of semicarbazide hydrochloride, raising the total yield of semicarbazide, as such, to 82%.

EXAMPLE II

A mixture of 32 g. of anhydrous hydrazine and 2 g. of iron carbonyl was heated for 12 hours at 100° C. under a pressure of 500–600 atm. of carbon monoxide. The product, a slurry of white crystals in a purple syrup, was filtered and rinsed with 40 ml. of absolute alcohol. The product, a somewhat sticky solid weighed 20.5 g. When this solid was extracted with four 250-ml. portions of boiling absolute alcohol, the dried residue consisted of 10 g. of hydrazodicarbonamide (25.1% yield). When the combined filtrate and washings were evaporated down to 20 ml., there was recovered 4 to 5 g. of crude semicarbazide (12% yield).

[EXAMPLE III]

[Fifty grams of hydrazine hydrate were heated at 175° C. for 4 hours under a pressure of 900 atm. of carbon monoxide to produce a slurry of white crystals in a light brown syrup. This mixture was filtered and washed with absolute alcohol to give 16 g. (32%) of solid melting at 160° to 165° C. Crystallization from absolute alcohol raised the melting point to 187° to 188° C. This compound was identified as the nitrogen compound corresponding to the molecular formula $C_2H_4N_40$ [1,2-dihydro-3(4-sym. tetrazone)]. It was water-soluble and boiled at 315° C.]

[EXAMPLE IV]

[Fifty grams of hydrazine hydrate were heated at 250° C. for 8.5 hours under a pressure of 900 atm. of carbon monoxide. The product was distilled to give as the main fraction 48 g. of white solid (52% yield). The product, indicated by analysis to be $C_4H_6N_6$, had a M. P. of 120.4° to 121.4° C., a B. P. of 268.5° to 269° C. at 759., was very water-soluble, and could be recrystallized from a mixture of alcohol and chloroform. It contained two basic groups titratable with acid but did not resinify with formaldehyde.]

Since hydrazine is potentially a cheap chemical, its reactions with carbon monoxide present an improved synthesis for existing products and for the preparation of new chemicals of interest per se and as intermediates for other syntheses. The process of this invention is an improvement over prior methods for preparing semicarbazide since it makes this material accessible in one step from carbon monoxide and the potentially low cost hydrazine. [The process is flexible and by the simple expedient of omitting the catalyst and adjusting the temperature conditions there can be formed the two water-soluble nitrogen compounds corresponding to the molecular formula $C_2H_4N_4O$ [1,2-dihydro-3(4-sym. tetrazone)] and $C_4H_6N_6$. The process for preparing the compounds having the molecular formulas $C_2H_4N_4O$ and $C_4H_6N_6$ as well as the latter compound are being claimed in my copending continuation application Serial No. 138,067, filed January 11, 1950.]

Semicarbazide *and* hydrazodicarbonamide [, and the nitrogen compound corresponding to the molecular formula $C_2H_4N_4O$ [1,2-dihydro-3-(-sym. tetrazone)]] are useful as synthetic resin intermediates, especially formaldehyde condensation products, as anti-shrinking materials for wool and rayon, as paper-sizes, rubber chemicals, metal deactivators, and the like. [The water-soluble compound of formula $C_4H_6N_6$ is useful as a paper size, fire retardant, corrosion inhibitor, and the like.]

As many apparently widely different embodiments of this invention may be made without departing from the spirit and scope thereof, it is to be understood that I do not limit myself to the specific embodiments thereof except as defined in the appended claims.

I claim:

1. A process for producing semicarbazide and hydrazodicarbonamide which comprises reacting carbon monoxide with hydrazine in the presence of a metal carbonyl catalyst at a temperature from 0° to 200° C. under superatmospheric pressure in excess of 5 atmospheres, and isolating from the reaction mixture one of said compounds semicarbazide and hydrazodicarbonamide.

2. A process for producing semicarbazide and hydrazodicarbonamide which comprises reacting carbon monoxide with hydrazine in the presence of a metal carbonyl catalyst at a temperature between 20° and 200° C. under a pressure in excess of 30 atmospheres and isolating from the reaction mixture one of said compounds semicarbazide and hydrazodicarbonamide.

3. A process for producing semicarbazide which comprises reacting carbon monoxide with hydrazine in the presence of a metal carbonyl catalyst at a temperature between 20° and 100° C. under a pressure in excess of 30 atmospheres and isolating from the reaction mixture semicarbazide.

4. A process for producing hydrazodicarbonamide which comprises reacting carbon monoxide with hydrazine in the presence of a metal carbonyl catalyst at a temperature between 50° to 200° C. under a pressure in excess of 30 atmospheres and isolating from the reaction mixture hydrazodicarbonamide.

5. A process for producing semicarbazide and hydrazodicarbonamide which comprises reacting carbon monoxide with hydrazine in the presence of an iron carbonyl catalyst at a temperature between 20° and 200° C. under a pressure in excess of 30 atmospheres and isolating from the reaction mixture one of said compounds semicarbazide and hydrazodicarbonamide.

References Cited in the file of this patent or the original patent

Jacobsen et al., "Ber. Deut. Chem.," vol. 4 (1871), page 949.

Hieber et al., "Ber. Deut. Chem.," vol. 61 (1928), pages 562–563.